March 1, 1932.  V. BENDIX  1,848,084
BRAKE SHOE
Filed Sept. 21, 1928

INVENTOR.
Vincent Bendix
BY
ATTORNEY.

Patented Mar. 1, 1932

1,848,084

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKE SHOE

Application filed September 21, 1928. Serial No. 307,490.

This invention relates to brakes and is illustrated as embodied in a brake shoe of the internal expanding type of automotive brake.

In the conventional brake shoe construction the rim or outer friction face of the shoe is usually covered with suitable friction material otherwise known as brake lining which is ordinarily riveted thereto.

The principal object of my invention is to supplement the rivet or other conventional securing means for the lining by utilizing novelly arranged depressions in the rim, which depression are preferably shallow but relatively large area. The lining, during the initial brake application, readily molds itself into these depressions, which structure thereafter aids in securing the lining to the rim of the shoe, obviating relative creeping between the parts.

A further object of my invention relates to a novel method of securing a lining material of initial uniform crosssection to the rim or outer surface of a friction element. This I accomplish by preforming the element with depressions and thereafter press, by any suitable means, the lining into said depressions.

Further objects and features of my invention, including various combinations of parts and desirable particular constructions will be apparent from the following description of the illustrative embodiments shown in the accompanying drawings, in which.

Figure 1:
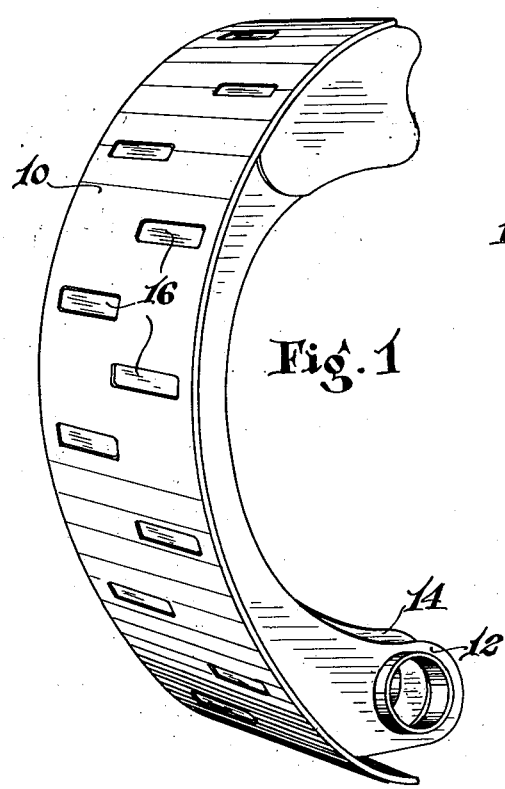
Figure 1 is a perspective view of my novel rim and lining arrangement shown as applied to a shoe of the double web type.

In the embodiment illustrated in Figure 1, 10 denotes the rim of a brake shoe provided with spaced reinforcing web portions 12 and 14 extending substantially at right angles thereto.

At predetermined spaced intervals along each side edge of the shoe I prefer to provide relatively shallow depressions 16 of substantially rectangular outline, the same being of substantial area. I further suggest that the depressions of each row be staggered with respect to each other as clearly indicated in Figure 1.

The depressions referred to may be mere indentations in the rim, the under surface of the same to be smooth, however I prefer that the depressions be formed by pressing or embossing the rim locally to press the metal thereof inwardly, thus forming corresponding projections on the undersurface. Such depressions are admirably suited for the purpose indicated, namely that of supplementing the rivet securing means for the lining in retaining the lining on the rim.

Figure 2:
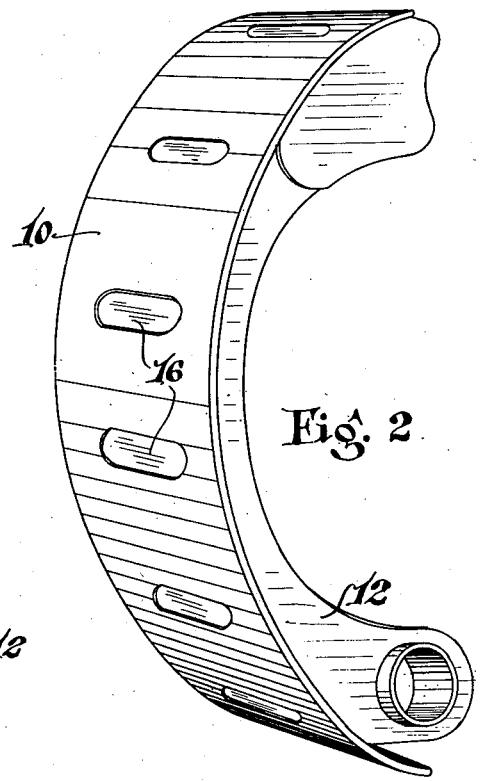
Figure 2 is a similar view disclosing the invention, slightly modified, and applied to a single web shoe.
Figure 3:
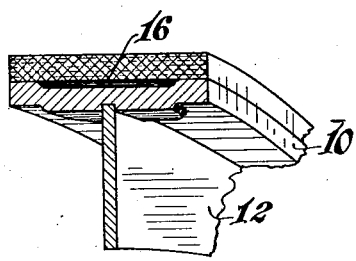
Figure 3 is a sectional view of Figure 2 indicating more clearly the rim depressions for accommodating the lining and Figure 4 is a section corresponding to Figure 3, but showing the shoe of Figure 1.
Figure 4:
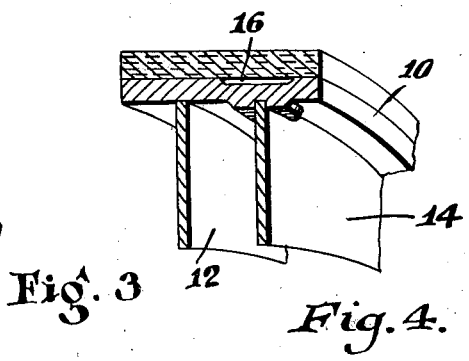

As indicated in Figure 2, I may adopt my invention to a shoe of the single web type in which case there is preferably provided but a single row of depressions, located substantially in the center of the rim.

The lining when first applied to the rim is of uniform cross section but with the first few brake applications is quickly depressed locally in the spaced depressions, being readily molded to shape itself to the rim contour. The lining may, however, be pressed prior to assembly of the brake into said depressions. The deleterious effect of relative movement between the lining and rim, that is its tendency to creep thereon, is thus obviated by my invention, the function of the rivets being thereby supplemented.

While but two embodiments of my invention have been disclosed in detail, it is not my intention to be limited thereby but only as far as is indicated by the scope of the appended claims.

I claim:

1. A brake shoe comprising, in combination, a rim portion provided with depressions therein, together with a friction material covering said rim and so constituted as to readily adapt itself to said depressions in said rim, said depressions being independent of the lining fastenings and the lining being adapted to imbed itself in said depressions in use.

2. A brake shoe provided with a rim and spaced reinforcing webs extending at an angle thereto, said rim being formed with rows of spaced relatively shallow depressions on said webs, the depressions in one row being staggered with respect to those in the other row.

In testimony whereof I have hereunto signed my name.

VINCENT BENDIX.